United States Patent [19]

Krichbaum

[11] Patent Number: 5,279,013
[45] Date of Patent: Jan. 18, 1994

[54] VEHICLE-WASHING APPARATUS WITH BRUSH SUPPORT HAVING FIXED SHAFTS AND LINEAR BEARINGS

[75] Inventor: Charles Krichbaum, Chatham, Va.

[73] Assignee: James Roncaglione, Vienna, Va.

[21] Appl. No.: 734,779

[22] Filed: Jul. 23, 1991

[51] Int. Cl.⁵ .............................................. B60S 3/06
[52] U.S. Cl. ................................. 15/53.3; 15/DIG. 2
[58] Field of Search ................. 15/53.2, 53.3, 97.3, 15/DIG. 2

[56] References Cited

U.S. PATENT DOCUMENTS

| 3,233,264 | 2/1966 | Nickl et al. | 15/53.2 |
| 3,633,231 | 1/1972 | Capra | 15/53.2 |
| 3,662,419 | 5/1972 | Dini | 15/53.3 |
| 3,852,842 | 12/1974 | Weigele et al. | 15/53.3 |
| 4,024,598 | 5/1977 | Miner | 15/53.2 |
| 4,769,868 | 9/1988 | Pagnanelli et al. | 15/53.3 |

FOREIGN PATENT DOCUMENTS

| 1936889 | 1/1971 | Fed. Rep. of Germany | 15/DIG. 2 |
| 2138967 | 2/1973 | Fed. Rep. of Germany | 15/DIG. 2 |
| 2203451 | 8/1973 | Fed. Rep. of Germany | 15/DIG. 2 |
| 2238210 | 4/1981 | Fed. Rep. of Germany | 15/DIG. 2 |
| 2006597 | 12/1969 | France | 15/DIG. 2 |
| 0306955 | 12/1988 | Japan | 15/53.2 |

Primary Examiner—Edward L. Roberts
Attorney, Agent, or Firm—Birch, Stewart, Kolasch & Birch

[57] ABSTRACT

A vehicle-washing apparatus which has a brush support mechanism which uses fixed support shafts and linear bearings, and a brush stabilization device using secondary fixed shafts. The entire weight of the brushes is supported by the fixed support shafts and the brushes are permitted to slide and pivot about the fixed support shafts via a primary bearing assembly having linear bearings which are sealed against air-borne contamination and which are provided with a self-contained lubrication system. A retraction/retention mechanism for the brushes uses a single continuous cable and a single air cylinder.

27 Claims, 6 Drawing Sheets

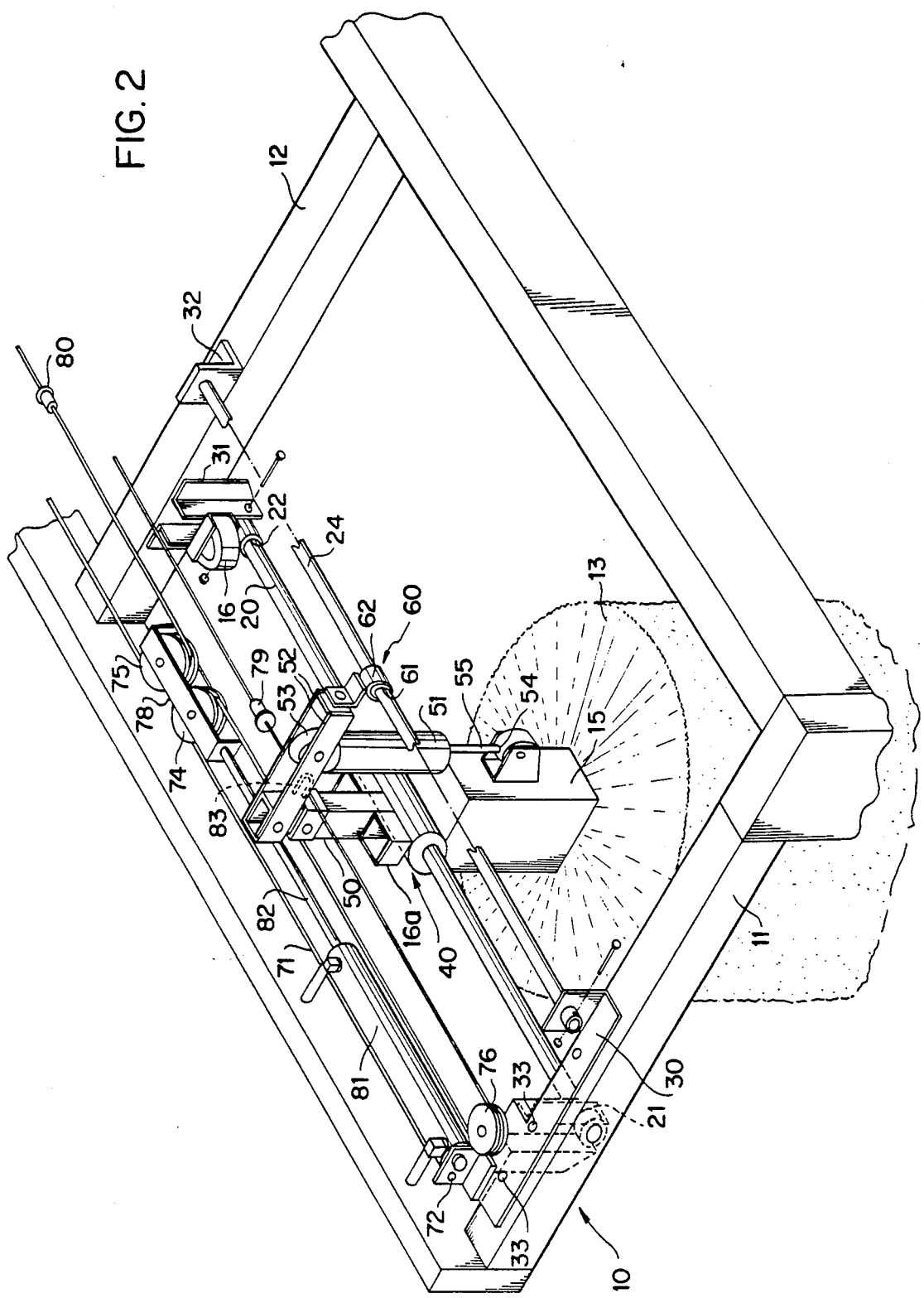

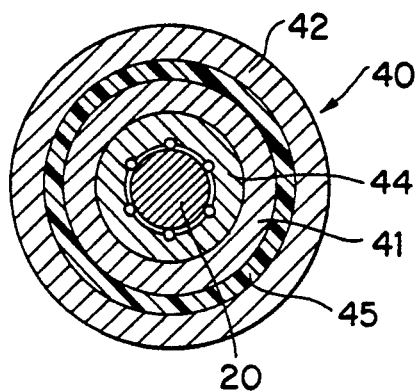
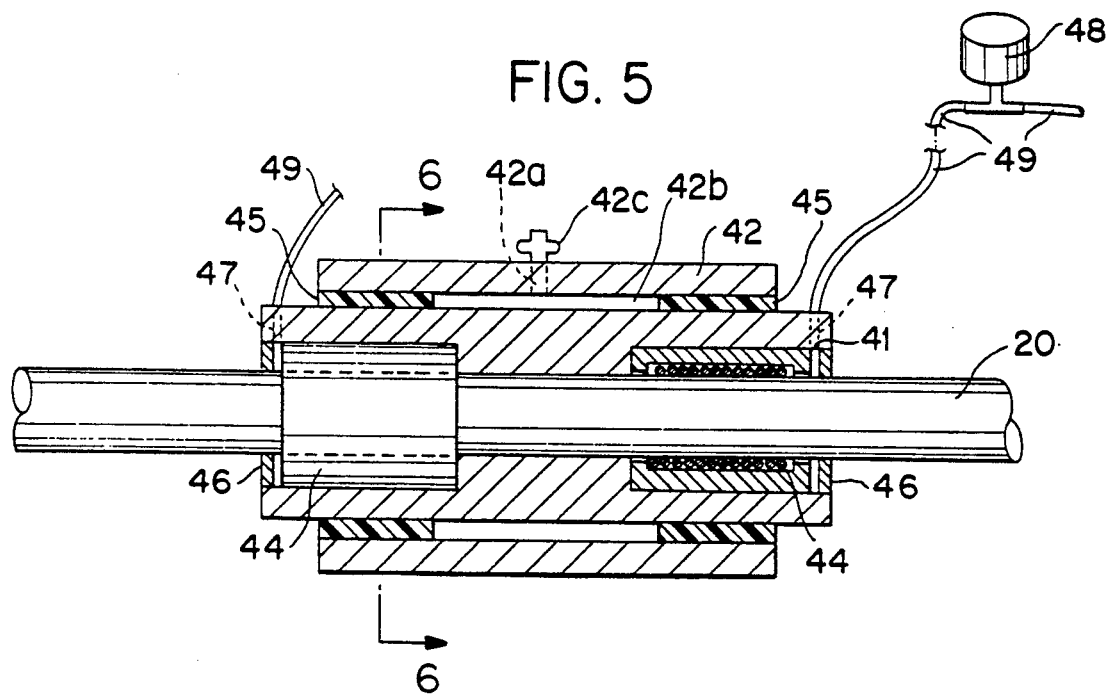

VEHICLE-WASHING APPARATUS WITH BRUSH SUPPORT HAVING FIXED SHAFTS AND LINEAR BEARINGS

FIELD OF THE INVENTION

The present invention relates to a vehicle-washing apparatus having an improved brush support mechanism using fixed support shafts and linear bearings, and an improved brush retraction/retention mechanism using a single continuous cable and a single air cylinder.

BACKGROUND OF THE INVENTION

The prior art vehicle-washing device with rolling gravity pressure controlled wrap brushes is disclosed in U.S. Pat. No. 4,769,868 to Pagnanelli et al, incorporated herein by reference. The Pagnanelli et al device has a brush support mechanism which uses track members which are rotatably attached at each end to a frame. The brushes of Pagnanelli et al are slidably supported on the track members by guide members, each guide member having eight rollers mounted on bearings supported by the guide member.

The Pagnanelli et al device suffers from several disadvantages. First, the track members, guide members, rollers and bearings are exposed to air-borne dirt particles, the presence of which tend to reduce the useful life of the device. Second, the Pagnanelli et al device requires sixteen bearings, eight for each of the two guide members, and two additional bearings for each of the two track members. Third, the rollers of Pagnanelli et al are subjected to uneven loading as the brushes pivot back and forth and slide in and out. The result of this uneven loading is uneven wear on the rollers leading to shortened useful life thereof.

SUMMARY OF THE INVENTION

A primary object of the present invention is to overcome the disadvantages described above and to provide an improved vehicle-washing apparatus. The present invention uses a total of six bearings to replace the sixteen of Pagnanelli et al. The bearings of the present invention are equipped with a self-contained lubrication system and are sealed for protection from air-borne dirt. The present invention uses two pairs of stationary guide shafts which are non-rotatably attached to a frame. These guide shafts require no rollers or guide members, as the slidability and rotatability of the brushes is provided by the six linear bearings which are located on the two stationary guide shafts.

A further object of the present invention is to provide an improved stabilizer assembly using an energy-absorbing device positioned between or adjacent the two non-rotatable guide shafts, and is attached to the brush housing.

A further object of the present invention is to provide a brush retraction/retention device which is simple in construction and requires a single piston-cylinder device to retract and retain both brushes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a perspective view of one-half of the brush support and brush retraction/retention mechanism of the present invention;

FIG. 5 is a detailed illustration of the primary linear bearings of the present invention;

FIG. 6 is a view along line 6—6 in FIG. 5;

DETAILED DESCRIPTION OF THE PREFERRED EMBODIMENT

Figure 1:
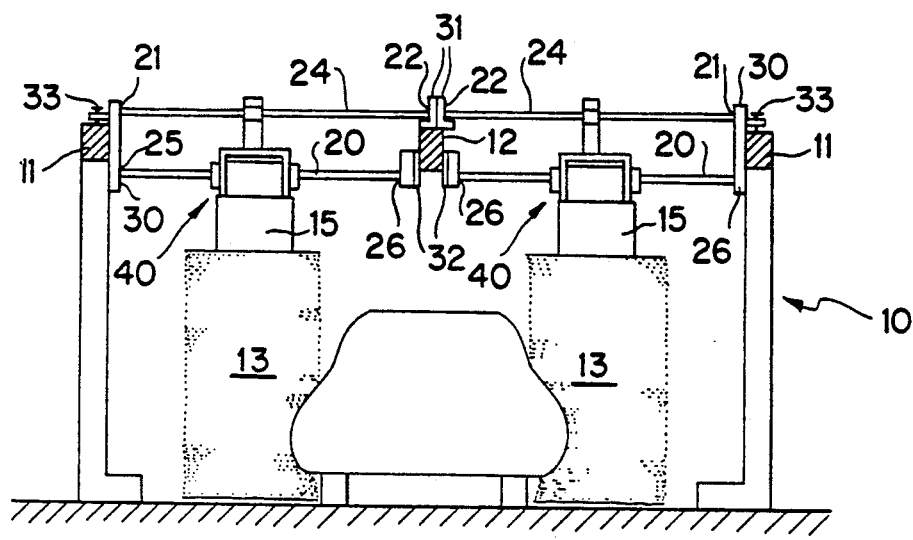
FIG. 1 shows the present invention with a vehicle to be washed located inside.

As shown in FIG. 1, the vehicle-washing apparatus of the present invention is equipped with a frame 10, having two outside members 11 and a center member 12. Frame 10 supports brushes 13 and their support and drive mechanisms. The details of the support and drive mechanisms for brushes 13 are shown in FIG. 2.

Specifically, brushes 13 are driven by drive motors, contained within enclosures 15, and through gear boxes (not shown), and are reversibly rotatable. The entire weight of the brushes 13, enclosures 15 and the gear boxes is supported by a pair of primary shafts 20. Primary shafts 20 are non-rotatably supported by frame 10. First ends 21 of shafts 20 are non-rotatably attached to a height adjustable support bracket 30, which is in turn supported on outside member 11 of frame 10. Second ends 22 of shafts 20 ar non-rotatably attached to a fixed support bracket 31, which is in turn supported on center member 12 of frame 10.

Each enclosure 15 and brush 13 is slidably and rotatably supported by primary shaft 20 through a linear bearing assembly 40. As shown in FIGS. 5 and 6, each linear bearing assembly 40 is composed of a pair of recirculating-ball type linear bearings 44 supported in an inner housing 41, a pair of plastic bushings 45 surrounding housing 41 and an outer housing 42. Inner housing 41 is counterbored in order to accommodate linear bearings 44. Shaft 20 serves as the inner race for linear bearings 44. Therefore, shaft 20 is hardened to a surface hardness of approximately 65 Rc and an interior hardness of approximately 30 Rc and then chrome-plated. Linear bearings 44 are of the recirculating-ball type, such as Thomson linear ball bearing part number Super 20 or Super 24. These bearings are described in more detail in Bearings, Inc. Catalog, pages 142-151 which is incorporated herein by reference. Cleaning seals, 46 are placed on shaft 20 to seal the openings of inner housing 41 after linear bearings 44 have been installed. Linear bearings 44 are selected and installed so as to be slidable along shaft 20, but non-rotatable thereon. Any slight rotation of bearings 44 about shaft 20 is prevented, by the stabilizer assembly as will be described below. Inner housing 41 is provided with oil passages 47 which penetrate inner housing 41 to provide oil to linear bearings 44 from an enclosed oil reservoir 48 through hoses 49. This forms a self-contained lubrication system for linear bearings 44, and prevents exposure to air-borne dirt or other contaminants. Oil reservoir 48 can be filled with standard 30-weight motor oil. Therefore, inner housing 41 is slidably and non-rotatably supported on shaft 20.

In addition, outer housing 42 is rotatably supported on inner housing 41 by a pair of plastic bushings 45. Outer housing 42 is penetrated by a passage 42a through which grease is pumped into the space 42b between plastic bushings 45. The passage 42a is sealed by a grease nipple 42c. This grease serves to lubricate plastic bushings 45, thereby allowing outer housing 42 to rotate about inner housing 41. Outer housing 42 is prevented from sliding along inner housing 41 by the stabilizer assembly as will be described below.

The mounting of enclosures 15 o shafts 20 via linear bearing assemblies 40 allows enclosures 15 and brushes 13 to pivot freely about shaft 20 and to slide back and forth between outside member 11 and center member 12 of frame 10. Center member 12 and outside members 11 are equipped with bumpers 16 near each end of shaft 20, one of which is shown in FIG. 2, in order to prevent center member 12, fixed supports 31, outside members 11 and adjustable supports 30 from coming into direct contact with enclosure 15 as it slides along shaft 20. Instead, bumpers 16 would contact spacers 16a attached to a support tube 50, which support tube 50 is part of the stabilizer assembly described below.

Figure 9:
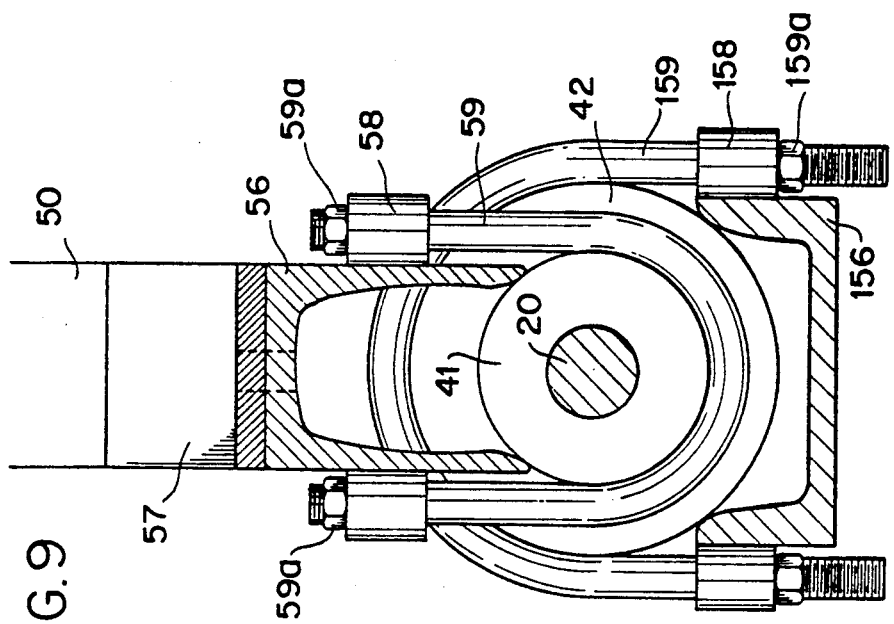
FIG. 9 is a partial end view of the primary linear bearing attachment to the stabilizer assembly as shown in FIG. 8.
Figure 8:
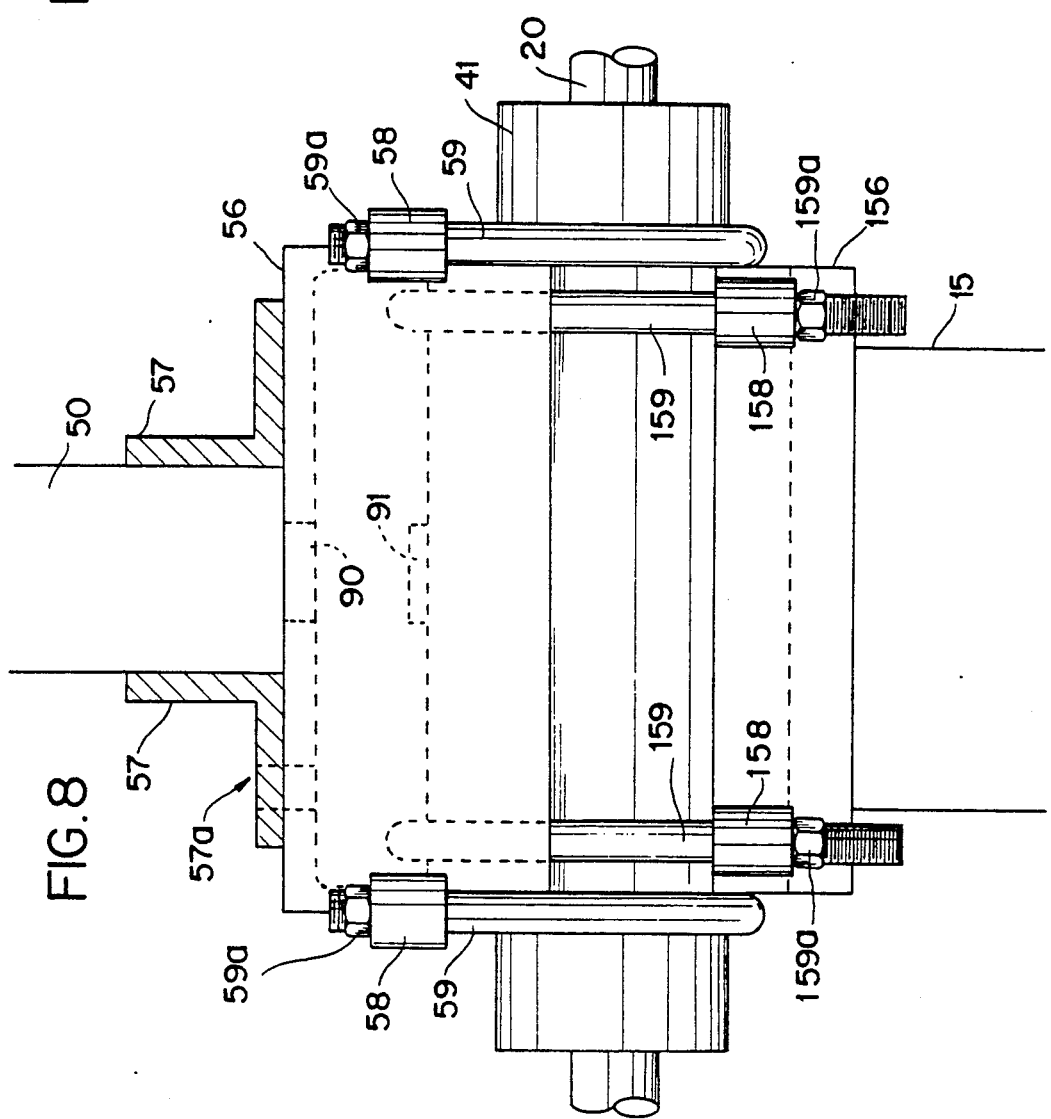
FIG. 8 is a detailed illustration of the primary linear bearing attachment to the stabilizer assembly of the present invention.

The free pivoting of enclosures 15 and brushes 13 about shafts 20 is limited by stabilizer assemblies. These stabilizer assemblies include a pair of secondary shafts 24 as shown in FIG. 2. Each secondary shaft 24 is non-rotatably attached to frame 10, at first ends 25 in adjustable bracket 30, and at second ends 26 in fixed brackets 32 attached to center member 12 of frame 10. Secondary shafts 24 serve to limit pivoting of brushes 13 when they contact a vehicle via a stabilizer support tube 50 and an energy-absorbing device 51 as shown in detail in FIGS. 8, 9 and 10, and described as follows.

Stabilizer support tube 50 is welded to a pair of angle irons 57 which in turn are bolted to a first U-channel 56 at 57a by a bolt (not shown). U-channel 56 is provided with two pairs of eyes 58 which are welded to U-channel 56 on the outside surface thereof. A pair of U-bolts 59 are inserted through the unthreaded eyes 58. U-bolts 59 are sized to fit snugly about inner housing 41 of primary linear bearing 40. Nuts 59a are screwed onto the ends of U-bolts 59, thereby fixedly connecting inner housing 41 to stabilizer support tube 50 via U-channel 156.

Figure 10:
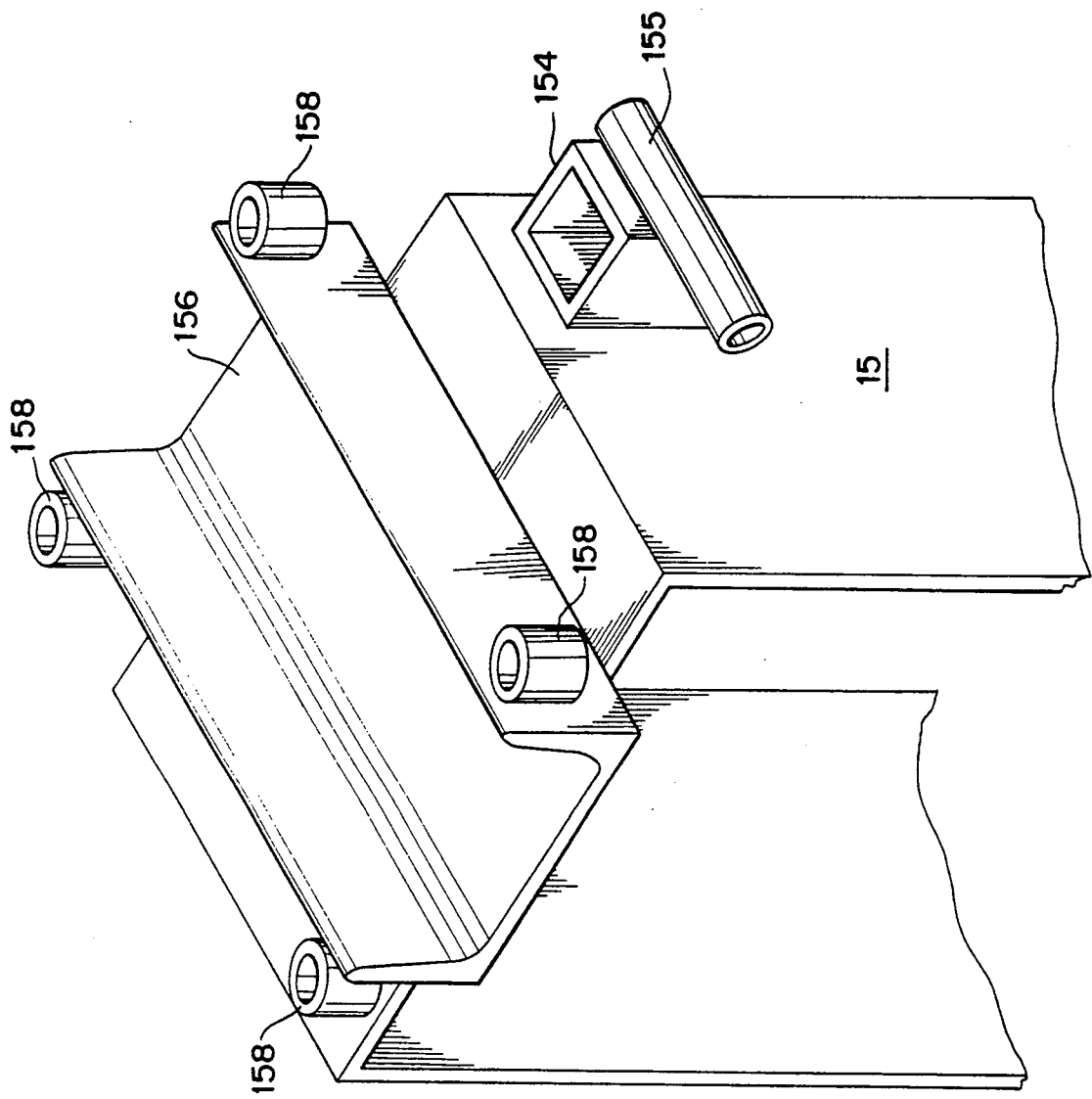
FIG. 10 is a partial perspective view of the enclosure of the present invention.

In a similar manner, enclosure 15 is fixedly attached to outer housing 42 of primary linear bearing 40 through a second U-channel 156. Enclosure 15 is welded to U-channel 156 as shown in FIG. 10. U-channel 156 is provided with two pairs of eyes 158 which are welded thereto, and a pair of U-bolts 159 and nuts 159a. U-bolts 159 are sized to fit snugly about outer housing 42, such that when nuts 159 are affixed to the ends of U-bolts 159 and tightened, enclosure 15 is fixedly connected to outer housing 42.

As was described above, inner housing 41 is slidably and non-rotatably attached to shaft 20. Therefore, stabilizer support tube 50 is also slidably and non-rotatably attached to shaft 20. In addition, outer housing 42 is rotatably attached to shaft 20 via inner housing 4 and plastic bushings 45. Therefore, enclosure 15 is also rotatably attached to shaft 20. It should also b noted that the position of the pair of U-bolts 159 is inside of the pair of U-bolts 59, see FIG. 8. Therefore, outer housing 42 cannot slide relative to U-bolts 59, nor relative to inner housing 41. This location of the pairs of U-bolts 59, 159 is the mechanism which prevents outer housing 42 and enclosure 15 from sliding on plastic bushings 45.

Referring to FIG. 2, the remainder of the stabilizer assembly is as described below. The top end of stabilizer support tube 50 is bolted to a pair of crossbars 52 at one end thereof. The crossbars 52 are also attached to secondary shaft 24 via a secondary bearing assembly 60, described in detail below. In addition, crossbars 52 pivotably support the top end 53 of energy-absorbing device 51. This top end 53 can be located in the middle section of crossbars 52 (between stabilizer support tube 50 and secondary shaft 24) as shown in FIG. 2. Alternatively, top end 53 can be located at an end of crossbars 52, with crossbars 52 extending past secondary shaft 24. This alternative is not shown in the Figures.

In either case, energy-absorbing device 51 has a rod 55 extending therefrom. The lower end 54 of rod 55 is pivotably attached to enclosure 15 as shown in FIG. 2. The attachment of lower end 54 to enclosure 15 can also be accomplished as shown in FIG. 10, wherein a rectangular tube 154 is welded to enclosure 15 and a circular tube 155 is welded to rectangular tube 154. The lower end 54 of energy-absorbing device 51 would be a ring (not shown) which could be slipped around circular tube 155 and secured with a bolt (not shown) and a washer (not shown).

The stabilization affect of this stabilizer assembly on the brushes 13 will be described in detail below. However, it should be noted that the stabilizer assembly also serves to prevent any slight rotation of inner housing 41 of primary linear bearing 40 about primary shaft 20. Rotation thereof is prevented because stabilizer support tube 50 is prevented from rotating about primary shaft 20 due to crossbars 52 being attached to secondary shaft 24 through secondary bearing 60. The non-rotatability of stabilizer support tube 50 is then transferred to inner housing 41 by virtue of their interconnection via U-channel 56 and U-bolts 59.

The secondary bearing 60 forms a slidable connection between crossbars 52 and secondary shaft 24. Since this bearing does not support the weight of brush 13 and enclosures 15, various types of bearings can be used. In any event, the secondary bearing 60 will comprise secondary shaft 24 acting as an inner race, a secondary linear bearing 61 and an outer housing 62 to which crossbars 52 will be attached. The bearing 61 can be a linear bearing of the recirculating-ball type, similar in all major respects to primary linear bearings 44. The secondary linear bearing 61 may be smaller than primary linear bearing 44. If a recirculating-ball type bearing is used, then secondary bearing 60 will also include cleaning seals (not shown) similar to cleaning seals 46 on primary shaft 20, and a supply of oil from oil reservoir 48 through a hose (not shown) and an oil passage (not shown) in outer housing 62.

Alternatively, and more preferably, secondary linear bearing 61 can be a simple lined sleeve such as a Frelon-lined bearing known as a Simplicity linear bearing, manufactured by Pacific Bearing Co. The Simplicity bearing comprises an aluminum body, an inner bonding agent and a Frelon coating. This Simplicity bearing requires no external lubrication, and water from the vehicle-washing apparatus which might be splashed on the bearing or shaft actually helps with proper bearing performance.

The sliding of enclosures 15 and brushes 13 along primary shafts 20 is controlled by two different mechanisms. First, sliding in the direction from the outside member 11 toward center member 12 of frame 10 is made possible by the force of gravity acting on the enclosures 15 and brushes 13 due to the fact that the first ends 21 of primary shafts 20 can be elevated above the level of second ends 22 by adjustment of the adjustable support bracket 30. Adjustable support bracket 30 is positioned on top of each outside member 11, the height of this positioning being controlled by a pair of jack-screws 33 which pass through the support bracket 30 and contact the upper surface of outside member 11. When the first ends 21 of primary shafts 20 are raised above the level of second ends 22, then enclosures 15 and brushes 13 will tend to slide along shafts 20 toward center member 12. The adjustment of adjustable support bracket 30 is accomplished by loosening two locating screws (not shown) in outside member 11, rotating jack-screws 33 to raise adjustable support bracket 30 to the desired height via threaded engagement with jack-screws 33, then retightening the locating screws. The locating screws penetrate adjustable support bracket 30 through vertically-elongated slots (not shown). The vertically extending slots and locating screws are located on the inner vertical face of support 11. This height adjustment of the first ends 21 of primary shafts 20 is important, as the degree of tilt of primary shafts 20 determines the amount of pressure which brushes 13 will exert on the vehicle to be washed.

Figure 3A:
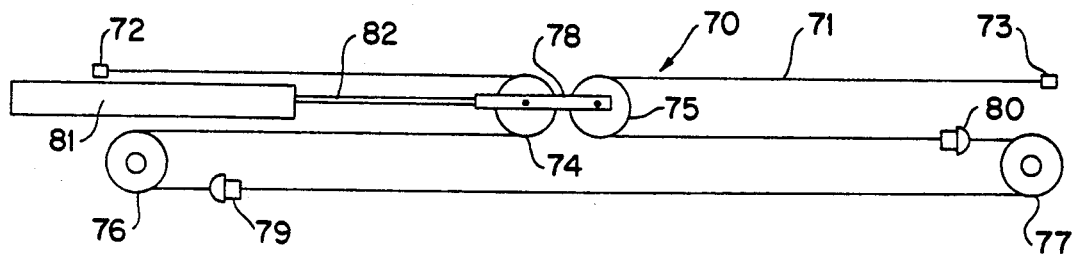
FIG. 3A shows the brush retraction/retention mechanism of the present invention in the retracted position.
Figure 3B:
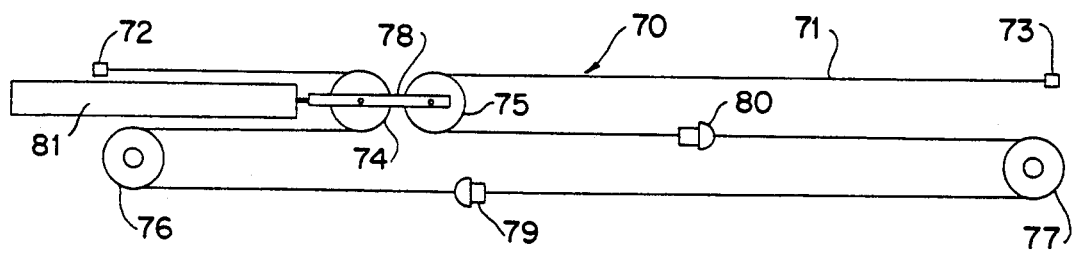
FIG. 3B shows the brush retraction/retention mechanism of the present invention in the washing position.

This sliding of enclosures 15 and brushes 13 toward center member 12 is also controlled via a retraction and retention mechanism 70, shown in an isolated view in FIGS. 3A-3B. Retraction and retention mechanism 70 includes a single continuous cable 71 which is anchored at its ends 72, 73 to the outside members 11 of frame 10. Cable 71 is held taut and its path is defined by a plurality of pulleys 74, 75, 76, 77. Pulleys 74 and 75 are rotatably attached to a yoke 78. Pulleys 76 and 77 are rotatably attached to outside members 11 at points adjacent to but separated from cable anchor points 72 and 73. Cable 71 is equipped with two push brackets 79, 80 which are fixedly attached to cable 71 at preset locations. A piston-cylinder device 81, preferably an air cylinder, is positioned so that its push rod 82 is attached to yoke 78. Push brackets 79 and 80 function to push enclosures 15 and brushes 13 away from center member 12 against the force of gravity by cooperating with guide brackets 83 which are attached to stabilizer tubes 50. Cable 71 is threaded through guide brackets 83, but push brackets 79 and 80 are too large to fit through guide brackets 83. The operation of this retraction/retention mechanism will be described in detail below.

Figure 4A:
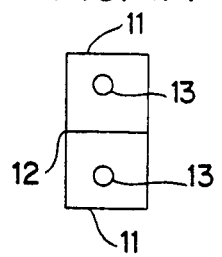
FIGS. 4A-4G show the operation sequence of the present invention.
Figure 4B:
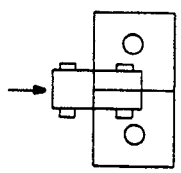
Figure 4C:
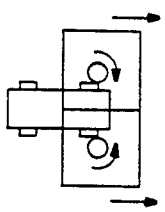
Figure 4D:
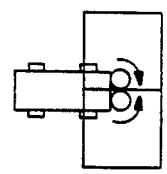

The operation sequence of the vehicle-washing apparatus is as detailed below and as shown diagrammatically in FIGS. 4A-4G. In the non-use or home position, shown in FIG. 4A, the brushes 13 are retracted away from center member 12 and retained near outside members 11. In this position, the push rod 82 of cylinder 81 is extended and yoke 78 is moved in the direction of center member 12. Cable 71 moves with yoke 78 and push brackets 79, 80 move together with cable 71. In this home position, push brackets 79, 80 are positioned near outside members 11 as shown in FIG. 3A. Push brackets 79, 80 butt against guide brackets 83 and retain enclosures 15 and brushes 13 out along primary shafts 20 and away from center member 12 in the home position as shown in FIGS. 3A and 4A. A vehicle to be washed enters the wash apparatus and is parked with its front wheels in ine with brushes 13 as shown in FIG. 4B. At this point, the push rod 82 of cylinder 81 is retracted and yoke 81 moves toward outside member 11. Cable 71 moves together with yoke 81, and push brackets 79 and 80 move together with cable 71. When cable 71 stops, push brackets 79, 80 are positioned near center member 12 as shown in FIGS. 3B and 4C. As a result, push brackets 79, 80 no longer butt against guide brackets 83 to restrain the slide of enclosures 15 and brushes 13. The enclosures and brushes slide under the force of gravity along primary shafts 20 until the brushes contact the vehicle as shown in FIG. 4C. At the same time, brushes 13 begin to rotate in a first direction. This rotation will tend to drag the brushes up along the sides of the vehicle and across the front of the vehicle as shown in FIG. 4D. At the same time, a drive mechanism (not shown) pushes the entire vehicle washing apparatus forward on rails (not shown) in the manner of a conventional rollover gantry washing system.

Figure 4E:
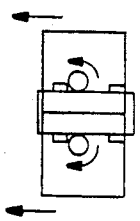
Figure 4F:
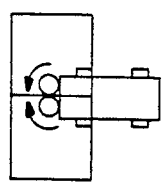
Figure 4G:
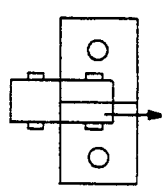

When the brushes come together in front of the vehicle, the brushes reverse direction of rotation and begin to travel back along the vehicle. The brushes travel down the length of the vehicle and across the back of the vehicle as shown in FIGS. 4E and 4F. When the brushes reach the center back of the vehicle, the direction of brush rotation again reverses and the brushes travel toward the front of the vehicle and return to the home position. Brush rotation then stops and cylinder 81 is activated to retract the brushes and retain them near the outside member 11 of frame 10. The vehicle is then driven out of the apparatus as shown in FIG. 4G.

Figure 7A:
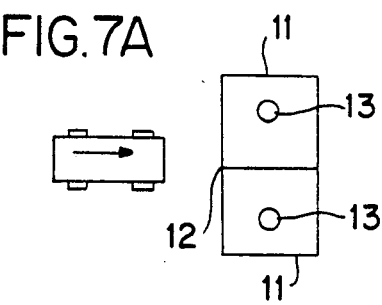
FIGS. 7A-7E shows an alternate operation sequence for the present invention.
Figure 7B:
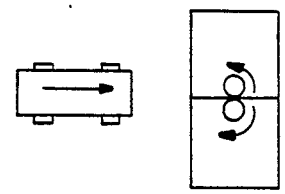
Figure 7C:
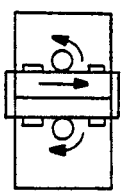
Figure 7D:
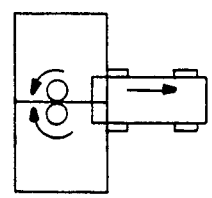
Figure 7E:
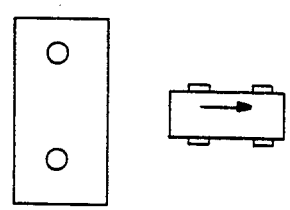

An alternative operation sequence is illustrated in FIGS. 7A-7E in which the vehicle is dragged along under a fixed vehicle-washing apparatus by a conveyor (not shown), or in which the vehicle is slowly driven through a fixed vehicle-washing apparatus. In this alternative embodiment, a vehicle approaches the vehicle-washing apparatus in which the brushes 13 are in the retracted position as shown in FIG. 7A. When the vehicle nears the apparatus, a switch (not shown) is tripped, causing the cylinder 81 to actuate and brushes 13 to slide together an begin to rotate as shown in FIG. 7B. The vehicle is driven or dragged in a conventional manner through the device as shown in FIGS. 7C and 7D, with the brushes being pushed out and along the vehicle by the force of the forward movement of the vehicle itself. When the brushes come together behind the vehicle as shown in FIG. 7D, brush rotation stops, cylinder 81 is reactuated and the brushes return to the retracted position. The vehicle exits or is dragged out as shown in FIG. 7E.

During brush rotation, the brushes may pivot toward the front or rear of the vehicle. This pivoting is damped by stabilizer tube 50, energy-absorbing device 51 and secondary shafts 24. As the brushes attempt to pivot, the rod 55 of energy-absorbing device 51 either extends or retracts depending upon the direction of pivot. The top end 53 of energy-absorbing device 51 is fixed to prevent twisting movement thereof by virtue of cross bars 52 and stabilizer tube 50 which is bolted to non-rotatable inner housing 41 of linear bearing assembly 40 via U-channel 56 and U-bolts 59. Therefore, energy-absorbing device 51 has one fixed (non-rotatable) end and one free end, and the relative motion between the two ends is damped by the energy-absorbing device itself. As a result, brushes 13 are able to pivot about primary shafts 20, but this pivoting is controlled and damped by the action of the energy-absorbing device. As a result, brushes 13 maintain good contact with the vehicle being washed, but are flexible enough to accommodate various sizes and shapes of vehicles.

An additional aspect of the present invention is a failure detection and prevention system which will sense excessive pivoting of the brushes 13, stop brush rotation and retract the brushes. This system comprises a proximity switch 90 located at the base of stabilizer support tube 50. Proximity switch 90 is a sensor which detects the presence beneath it, in the range of a preset angle, of a metal plug 91 which is attached to the exterior of outer housing 42 of primary bearing 40. During normal brush pivoting, plug 91 will travel with the pivoting of the brush and outer housing 42. So long as the angle of pivot does not exceed a pre-selected limit, plug 91 will be sensed by proximity switch 90. However, if the brushes 13 pivot by an extraordinary and abnormal amount, then plug 91 will not be sensed by proximity switch 90. As a result, proximity switch 90 will send a signal to the brush rotation motor and to the brush retraction/retention device to shut down the, brushes and to retract and retain them away from center member 12 of frame 10. This is a failure prevention system which shuts down the vehicle-washing apparatus in case of an abnormal condition which causes excessive brush pivoting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle-washing apparatus, comprising:
   a frame having two outside members and a center member;
   a pair of primary shafts, each of said primary shafts being non-rotatably attached at a first end to one of said outside members of the frame, and non-rotatably attached at a second end to said center member of the frame;
   a pair of brushes;
   a primary bearing means;
   a pair of enclosures connected to said pair of brushes, each of said brushes being connected to one of said primary shafts via one of said enclosures, said enclosures being slidably and pivotally connected to said primary shafts via said primary bearing means;
   a pair of secondary shafts, each of said secondary shafts being non-rotatably attached at a first end to one of said outside members of the frame and non-rotatably attached at a second end to said center member of the frame, said secondary shafts running parallel to said primary shafts;
   secondary bearing means slidably connected to said secondary shafts; and
   stabilizer means attached to said primary bearing means, said secondary bearing means, and said enclosure for stabilizing said pair of brushes.

2. The vehicle-washing apparatus of claim 1, wherein said primary shafts are chrome-plated and have a surface hardness of approximately 65 Rc.

3. The vehicle-washing apparatus of claim 1, wherein said primary bearings means comprise primary linear bearings.

4. The vehicle-washing apparatus of claim 3, wherein each of said enclosures has a pair of primary linear bearings.

5. The vehicle-washing apparatus of claim 4, wherein said primary linear bearings have recirculating balls.

6. The vehicle-washing apparatus of claim 3, wherein said pair of primary linear bearings are slidably and non-rotatably mounted on said primary shaft and held within an inner housing, and further comprising a pair of plastic bushings mounted on said inner housing, and an outer housing which is rotatably and non-slidably supported on said plastic bushings.

7. The vehicle-washing apparatus of claim 1, wherein said secondary bearing means comprise a secondary linear bearing slidably mounted on said secondary shaft.

8. The vehicle-washing apparatus of claim 7, wherein said secondary linear bearing has recirculating balls.

9. The vehicle-washing apparatus of claim 7, wherein said secondary linear bearing is a Frelon-lined body.

10. The vehicle-washing apparatus of claim 7, wherein said stabilizer means comprises: a stabilizer tube fixedly attached to an inner housing of the primary bearing means and an outer surface of the secondary bearings; and an energy-absorbing unit attached to said stabilizer tube and said enclosure.

11. The vehicle-washing apparatus of claim 10, wherein said stabilizer tube is attached to the inner housing of the primary bearing means by U-bolts.

12. The vehicle-washing apparatus of claim 10, further comprising a proximity sensor attached to said stabilizer tube and to said primary bearing means, so as to stop brush rotation and retract the brushes is excessive pivoting of said brush is detected.

13. The vehicle-washing apparatus of claim 1, further comprising support brackets attached to said outside members of the frame, first ends of the primary and secondary shafts being non-rotatably attached to said support brackets.

14. The vehicle-washing apparatus of claim 13, wherein said support brackets are equipped with means for raising and lowering said support bracket relative to said outside member of the frame.

15. The vehicle-washing apparatus of claim 14, wherein said means for raising and lowering is a pair of jack-screws.

16. The vehicle-washing apparatus of claim 1, further comprising means for retracting said brushes and enclosures away from said center member of the frame and means for retaining said brushes and enclosures in a retracted position.

17. The vehicle-washing apparatus of claim 16, wherein said means for retracting and said means for retaining comprise a cable system.

18. The vehicle-washing apparatus of claim 17, wherein said cable system comprises a single continuous cable with ends anchored onto each of said outside members of the frame.

19. The vehicle-washing apparatus of claim 18, wherein said cable system further comprises a plurality of pulleys which form a travel path for said cable.

20. The vehicle-washing apparatus of claim. 19, wherein said plurality of pulleys comprises four pulleys, two of said pulleys rotatably attached to a yoke and two of said pulleys rotatably attached to each of said outside members of the frame.

21. The vehicle-washing apparatus of claim 20, wherein said cable system further comprises a pair of push brackets fixed to said cable.

22. The vehicle-washing apparatus of claim 21, wherein said enclosures are equipped with guide brackets having openings sized such that said cable is threaded through said opening in the guide brackets and said push brackets abut but do not fit through said openings, such that when said push rod is extended from said cylinder, said yoke moves toward said center member of the frame and said push brackets abut said guide brackets and push said enclosures and brushes toward said side members of the frame.

23. The vehicle-washing apparatus of claim 20, further comprising a means for moving said yoke back and forth between said outside members of the frame.

24. The vehicle-washing apparatus of claim 23, wherein said means for moving said yoke comprises a single piston-cylinder device having a push rod attached to said yoke.

25. The vehicle-washing apparatus of claim 1, further comprising a self-contained lubrication system for said primary bearing means.

26. The vehicle-washing apparatus of claim 25, wherein said self-contained lubrication system comprises an oil-reservoir, a plurality of hoses, and oil passages provided in said primary bearing mean such that said hoses connect said oil reservoir to said oil passages.

27. The vehicle-washing system of claim 1, further comprising a pair of bumpers disposed on opposite sides of said center member of the frame and a bumper disposed on each outside member of the frame near said first and second ends of the primary shafts, respectively for preventing direct contact of moving parts with said enclosures.

* * * * *